United States Patent
Credner et al.

[15] 3,658,537
[45] Apr. 25, 1972

[54] COLOR PHOTOGRAPHIC MATERIAL COMPRISING A BLUE-GREEN COLOR COUPLER

[72] Inventors: Hans-Heinrich Credner, Munich; Hans Glockner, Pullach; Fritz Muller, Munich; Friedrich Wilhelm Kunitz, Leverkusen, all of Germany

[73] Assignee: AGFA-Gevaert Aktiengesellschaft, Leverkusen, Germany

[22] Filed: Nov. 18, 1968

[21] Appl. No.: 776,747

[30] Foreign Application Priority Data

Nov. 18, 1967 Germany..................P 15 97 499.9

[52] U.S. Cl..................................96/74, 96/100, 260/144, 260/505 R, 260/558 R
[51] Int. Cl..............................................G03c 1/40
[58] Field of Search................................96/100, 74

[56] References Cited

UNITED STATES PATENTS

| | | |
|---|---|---|
| 2,474,293 | 6/1949 | Weissberger et al.................96/100 X |
| 2,498,466 | 2/1950 | Thompson..............................96/100 |
| 2,657,134 | 10/1953 | Graham et al. .........................96/100 |
| 3,135,609 | 6/1964 | Klinger...................................96/100 |
| 3,285,747 | 11/1966 | Coles......................................96/100 |
| 3,337,344 | 8/1967 | Kimura et al. ..........................96/100 |

Primary Examiner—William D. Martin
Assistant Examiner—Ralph Husack
Attorney—Michael S. Striker

[57] ABSTRACT

A blue-green color coupler comprising a 1-hydroxy-2-benzoyl or -naphthoyl amino-substituted acid wherein the amino group is attached to the ring-attached carbonyl group through one or more amino acids, and color-photographic material comprising said coupler.

16 Claims, No Drawings

COLOR PHOTOGRAPHIC MATERIAL COMPRISING A BLUE-GREEN COLOR COUPLER

BACKGROUND OF THE INVENTION

The invention relates to a blue-green component for photographic color materials. Dyes formed by reaction with a developer in photographic material must meet specific optical requirements. Ideally, a blue-green color-forming agent should absorb red light completely and should transmit as much as possible of the green and blue light. A color-forming agent also should provide for high color densities.

Apart from the optical properties, the dyes must meet high requirements regarding hydrolytic stability and light fastness. In addition, a color coupler must be easy to disperse and must give a homogeneous dispersed color grain and a good coupling speed.

As couplers for blue-green, naphthols are particularly suitable, preferably the condensation products of aliphatic, aromatic or heterocyclic amines with 1-hydroxy-2-naphthoic acids or derivatives thereof, yet many of the conventional blue-green couplers will yield dyes which do not meet all requirements.

SUMMARY OF THE INVENTION

It is therefore an object of the invention to provide a new blue-green coupler with good absorption properties and a high color density which will result in dyes that have a good hydrolytic stability.

These objects are met by a compound of the general type described wherein an amino acid is incorporated in the molecule to connect the amino group to the carbonyl group that is attached to the 1-hydroxy benzoyl or naphthoyl ring.

More specifically, the compounds of the invention have the formula

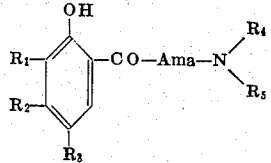

wherein $R_1$ and $R_2$ are the same or different and are hydrogen, alkyl, cycloalkyl, or halogen, or wherein $R_1$ and $R_2$ together and with the adjoining carbon atoms of the phenol ring form a fused benzene ring or a fused cycloalkyl ring; $R_3$ is hydrogen or a 2-equivalent coupler substituent; $R_4$ is hydrogen, alkyl or aralkyl; $R_5$ is alkyl, aralkyl, aryl, aryl substituted by alkyl, halogen or alkoxy; and Ama is at least one amino acid residue.

DESCRIPTION OF THE PREFERRED EMBODIMENTS

In the above formulated compounds of the invention, the alkyl group both in alkyl and in alkyl-substituted radicals preferably comprises between eight and 22 carbon atoms. This applies specifically to the radicals identified as $R_1$, $R_2$, $R_4$, and $R_5$.

The 2-equivalent coupler substituents which may form the radical identified as $R_3$ preferably are chlorine or a sulfo- or substituted phenylazo- group such as acetyl-substituted phenylazo. The aryl in $R_5$ may be unsubstituted or may be substituted by alkyl, halogen, or alkoxy. The alkyl group both when standing by itself and as part of alkoxy preferably has from eight to 22 carbon atoms.

The amino acid residue identified as Ama may be a single amino acid residue or a peptide chain such as a dipeptide. The amino acid from which the residue is derived, e.g., may have from two to 12 carbon atoms and, for instance, may be glycine, alanine, phenylalanine, valine, leucine, serine, 4-amino-butyric acid, or 6-amino-caproic acid. The dipeptide may, for instance, be glycylglycine. The nitrogen atom in these amino acids which in the molecule is attached to the carbonyl group of the main ring may in turn be substituted, for instance, by alkyl or aryl. Alkyl in this case should preferably again have from eight to 22 carbon atoms and aryl should preferably be phenyl.

The following formulas illustrate some of the compounds coming under the general formula:

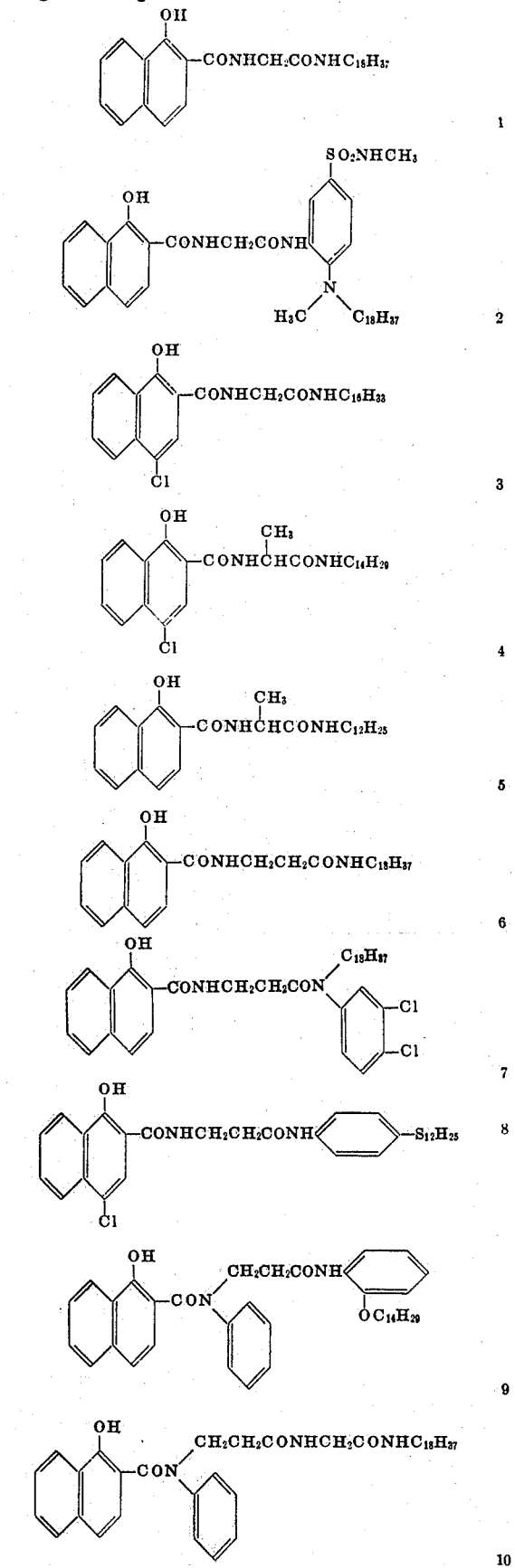

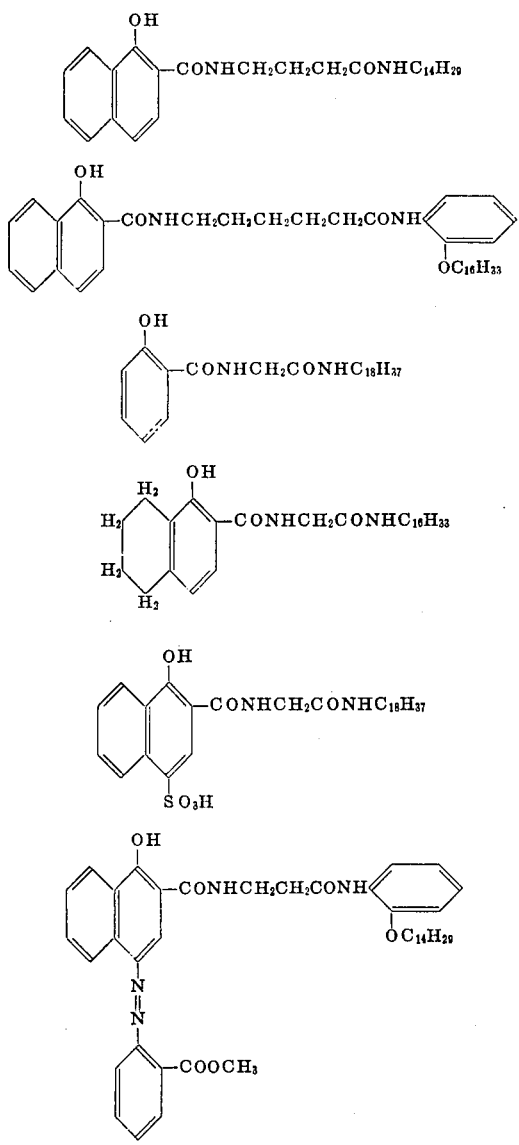

The following is a compilation of the melting points of some of the intermediate products. The ethyl esters are compounds with good crystallizing properties which can be obtained with a high degree of purity by recrystallization from ethanol. The saponification is effected in 5 N glacial acetic acid with 5 N hydrochloric acid. The synthesis of the phenyl esters is effected, for instance, be preparing a benzene-type suspension with phosphorus oxytrichloride and thus accomplishing complete solution. The chemical structure of the new compounds was confirmed by checking the mass spectra:

TABLE I.—INTERMEDIATES

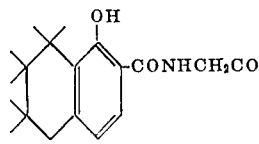

| | R | Ethyl-ester, degrees | Carbox-ylic acid, degrees | Phenyl-ester, degrees |
|---|---|---|---|---|
| Glycine | H | 131 | 204 | 138 |
| Glycine | Cl | 165 | 219 | 102 |
| α-Alanine | H | 138 | 176 | 117 |
| α-Alanine | Cl | 148 | 201 | 90 |
| β-Alanine | H | 94 | 140 | 129 |
| β-Alanine | Cl | 108 | 188 | 131 |
| | | 128 | 154 | 91 |

TABLE I —Continued

| | | | |
|---|---|---|---|
| (OH-naphthyl-CONHCH$_2$CO structure) | 85 | 162 | 104 |
| (OH-naphthyl-CON(CH$_2$CH$_2$CO)(phenyl) structure) | 99 | 150 | 130 |

The compounds of the invention may be made by proceeding through the aroyl amino acids. The alkyl esters of amino acids are first condensed with the phenyl esters of aromatic carboxylic acids. The aroyl aminoacid alkylesters are then subjected to saponification and the reaction product is then caused to react with the desired amine. This amination reaction may be effected by means of a phosphorazo reaction, or the compound in the form of its phenyl ester may be reacted in a salol melt. The latter method results in a higher yield and particularly pure final products.

The following examples illustrate the manner of making the compounds shown above as Nos. 1, 6, and 9.

EXAMPLE 1

This Example relates to the compound listed above as No. 1. The reaction proceeds as follows:

a. 1-hydroxy-naphthoyl-2-glycineethylester:

200 g glycineethylester and 400 g 1-hydroxynaphthoic acid-2-phenylester were heated in an oil bath in a round flask provided with a riser to 140° C for 5 hours. The phenol which split off was then removed by distilling it off in vacuum and the melt was poured into ethanol and caused to crystallize. The crude product was recystallized from ethanol.

M.p. 131° C, yield: 300 g.

b. 1-hydroxy-naphthoyl-2-glycine:

100 g of the ester obtained in Step (a) were dissolved in 700 ml glacial acetic acid and were maintained with 500 ml 5 N hydrochloric acid in a boiling-water bath for 40 minutes. The solution was poured into 3 l water and the precipitated product was removed by suction, washed neutral, dried and boiled with a high boiling-point gasoline.

M.p.: 204° C, yield: 77.2 g, which corresponds to 86 percent of the theoretical yield.

c. 1-hydroxy-naphthoyl-2-glycinephenylester:

50 g of the acid, that is 0.205 mol, obtained in Step (b) were subjected to stirring with 38.4 g (0.41 mol) phenol and 61.5 ml (0.205 mol) phosphorus oxytrichloride in 500 ml dry benzene for 5 hours upon reflux until complete solution was obtained. The resulting solution was washed with water, treated with a 3 percent sodium carbonate solution, washed neutral with water, dried, and concentrated by evaporation. The residue was recrystallized from a high boiling point gasoline.

M.p.: 138° C, yield: 32.1 g = 49 percent of the theoretical yield.

d. 1-hydroxy-naphthoyl-2-glycine-octadecylamide:

32.1 g of the phenylether, that is 0.1 mol, formed in the previous step, were heated together with 259 g (0.2 mol) octadecylamine to 150° C in a vacuum and the phenol that split off was removed by distillation. The melted mass was then poured into mechanol and caused to crystallize. It was recrystallized thereupon from ethanol.

M.P.: 126° C, yield: 35 g, which corresponds to 70 percent of the theoretical yield.

EXAMPLE 2

This example relates to the coupler of which the formula was shown above as No. 6. The process was again carried out in steps which were as follows:

(a) β-alanineethylester:

178 g β-alanine were heated with 1,000 ml ethanol and 150 g sulfuric acid for 18 hours upon reflux. The alcohol was removed by distillation and the residue was reacted with 400 ml ether. Ammonia was then introduced for 10 minutes and the ether was thereupon removed by decanting. The residue was again reacted with ether and this procedure was repeated five times. The combined ether fractions were dried with sodium sulfate and subjected to concentration by evaporation. The residue was fractionated. The main fraction boiled at 60° C (at 3–4 mm Hg).

Yield: 155 g, corresponding to 66 percent of the theoretical yield.

b. 1-hydroxy-naphthoyl-2-alanineethylester:

155 g β-alanineethylester and 264 g naphthsalol were condensed in a manner analogous to Example 1 and were precipitated in methanol. A two-fold recrystallization from methanol yielded 145 g hydroxy-naphthoyl-alanine-ester; m.p. 93°–94° C.

c. 1-hydroxy-naphthoyl-2-alanine and 1-hydroxy-naphthoyl-2-alaninephenylester:

Again obtained in a manner analogous to that described in Example 1. The melting points of these esters are listed in the above table relating to the Intermediate Products.

d. 1-hydroxy-naphthoyl-2-alanineoctadecylamide:

33.5 g (0.1 mol) of the thus formed phenyl ester were heated to 150° C in a vacuum with 26.9 g (0.1 mol) octadecylamine. The phenol that split off was removed by distillation and the fused mass was precipitated in methanol. Recrystallization from alcohol followed.

M.p.: 90°–91° C, yield: 31 g, which corresponds to 60 percent of the theoretical yield.

EXAMPLE 3

This example relates to the coupler listed above as No. 9. The making of the ester was carried out in the following steps:

a. N-phenylalanineethylester:

181 g β-bromopropionic acid-ethylester (1 mol) and 186 g (2 mols) aniline were maintained at 80° C upon stirring for 1 hour. The reaction was neutralized with a 5 percent sodium carbonate solution and the product was taken up in chloroform. After removing the solvent, 136 g N-phenylalanineethylester were obtained by fractional distillation at 128°–134° C (0.2 torr). This corresponded to a yield of 70 percent of the theoretical value.

b. 1-hydroxy-naphthoyl-2-N-phenylalanine-ethylester:

136 g (0.7 mol) N-phenylalanineethylester and 132 g (0.5 mol) naphthsalol were maintained at 140° C for 3 hours. The phenol was then distilled off in a vacuum and the fused mass was poured into methanol. Recrystallization was effected twice from methanol.

M.p.: 98°–99° C, yield: 109 g, corresponding to 60 percent of the theoretical yield.

c 1-hydroxy-naphthoyl-2N-phenylalanine:

The saponification was effected as in Example 1. The product obtained had a melting point of 150° C. The yield corresponded to 85 percent of the theoretical yield.

d. 1-hydroxy-naphthoyl-2-N-phenylalanine-2'-tetradecylhydroxyanilide:

30.5 g 2-tetradecylhydroxyaniline (0.2 mol) were dissolved in 500 ml abs. pyridine. 4.4 cc (0.05 mol) phosphorus oxytrichloride were added at 0° C and the solution was subjected to stirring for 3 hours. 33.5 g (0.1 mol) of the acid were then added and the reaction mixture was heated for 4 hours upon reflux. It was precipitated over ice-hydrochloric acid. The precipitate was removed by suction, washed with water and dried. Recrystallization was effected from alcohol.

M.p.: 86°–88° C, yield: 43 g, which corresponds to 69 percent of the theoretical yield.

The couplers of the invention can also be made other than by synthesis along the route of the aroylamino acids, for instance in conventional manner by condensing 1-hydroxy-naphthoic acid-phenylester with the corresponding amine, such as 6-aminocaproic acid-2-hexadecylhydroxyanilide (coupler listed above as No. 12). This method must be used if the free ethylesters of the amino acids are not sufficiently stable. It is necessary, in this case, first to block the amino group of the aminoacid by a protective group, such as carbobenzhydroxychloride. The desired amide or anilide can then be formed thereafter. The condensation can be effected in conventional form after eliminating the protective group.

THE PHOTOGRAPHIC EMULSIONS

The new couplers can be incorporated in a photographic emulsion by dissolving them in an aceticester and dispersing them in a gelatin solution to the extent that they are hydrophobic. If they are hydrophilic, that is if they include acid groups, they must be employed in an alkaline solution. As the vehicle or binding agent for the solution, gelatin is preferred. However, other vehicles may also be used. The emulsion is then applied to a support, for instance of glass, cellulose acetate, polyester film, or paper containing a barite filler. The emulsion may be applied to the support as a single coat, or it may be applied as part of several silver halide emulsions which contain the couplers for the other primary colors.

The new couplers are superior in many respects to the prior art products. Most of the blue-green couplers of the invention when developed result in distinctly higher color densities than obtainable with known coupling compounds. The dyes thus formed are of a high brilliancy, since the densities of the adjacent (secondary) colors are lower. Some of the compounds of the invention result in photographic dyes which are absolutely stable against hydrolysis.

The following examples illustrate the making of the photographic material

EXAMPLE 4

Two g of the coupler listed above as No. 1 were dissolved in 10 ml acetic acid ester and dispersed with a 50 ml 5 percent gelatin solution which contained 4 ml of a 10 percent sodium dodecylbenzenesulfonate. The dispersion was added to a photographic silver halide emulsion and was then cast on a support, subjected to exposure and developed in a bath containing 2-amino-5-diethylaminotoluene as color-developing agent. In reversal development, a blue-green color image was obtained having an absorption maximum of 652 nm.

The following table shows the color density, the percentage secondary absorption in the blue and green spectral range (measured with a Macbeth-Ansco-densitometer) and the percentage loss of color density in a high humidity oven (28 days, 60° C, 96 percent relative air humidity). In addition, data are furnished for comparison pertaining to two generally accepted high-quality couplers, i.e. (I) 1-hydroxy-2-N-octadecyl-naphthamide and (II) 1-hydroxy-(2',4'-diamylphenoxy-butyl)-2-naphthamide (U.S. Pat. No. 2,474,293):

TABLE II

| Coupler | D max | Absorption | | Loss of Density in High Humidity Oven |
| --- | --- | --- | --- | --- |
|  |  | blue | green |  |
| No. 1 | 1.92 | 24 | 18 | 1 % |
| Control I | 1.64 | 31 | 22 | 13 % |
| Control II | 1.33 | 31 | 20 | 14 % |

EXAMPLE 5

2.5 g of Coupler No. 9 were dissolved in 8 ml acetic acid ester and dispersed with 50 ml of a 5 percent gelatin solution containing 4 ml of 10 percent sodium-dodecylbenzenesulfonate. The dispersion was added to a photographic emulsion and cast, as in Example 1, then subjected to exposure and development.

The following Table shows the absorption maxima of the blue-green dyestuffs formed with different developers by negative and reversal process, and shows the color density of the dyes after storing for 1 and 28 days in a high humidity oven at 60° C and 96 percent relative humidity, and employing the emulsion of this example:

TABLE III

| Developing agent | Max. (nm) | Negative color density Before | Negative color density After [1] | Max. (nm) | Reversal color density Before | Reversal color density After [2] |
|---|---|---|---|---|---|---|
| N,N-diethyl-p-phenylenediamine | 631 | 1.52 | 1.50 | 635 | 1.84 | 1.79 |
| 2-amino-5-diethyl-aminotoluene | 650 | 0.73 | 0.71 | 648 | 1.40 | 1.36 |
| 2-amino-5-N-ethyl-N-methylsulfonamidoethyl-toluene | 646 | 0.94 | 0.95 | 644 | 0.49 | 0.48 |
| N-butyl-N-sulfobutyl-p-phenylenediamine (paper developer) | 640 | 1.17 | 1.17 | | | |

[1] After 1 day in high humidity oven.
[2] After 28 days in high humidity oven.

What is claimed as new and desired to be protected by Letters Patent is set forth in the appended claims:

1. A color-photographic material comprising a support, a blue-green diffusion-proof color coupler compound, and at least one photographic silver halide emulsion applied to said support, said emulsion containing said color coupler and said color coupler consisting essentially of a compound of the formula

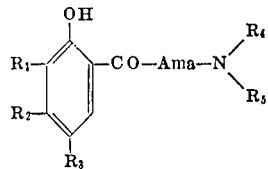

wherein $R_1$ and $R_2$ are the same or different and are hydrogen, alkyl, cycloalkyl or halogen, or wherein $R_1$ and $R_2$ together with the adjoining carbon atoms of the phenol ring form a fused benzene ring or a fused cycloalkyl ring, $R_3$ is hydrogen or a 2-equivalent coupler sibstituent, $R_4$ is hydrogen, alkyl or aralkyl, $R_5$ is alkyl, aralkyl, aryl or substituted aryl, and Ama is at least one amino acid residue or a substituted amino acid residue.

2. The material of claim 1 wherein the alkyl group in alkyl, aralkyl and alkoxy of $R_1$, $R_2$, $R_4$, and $R_5$ has from eight to 22 carbon atoms.

3. The material of claim 1 wherein the 2-equivalent substituent in $R_3$ is chlorine, a sulfo- group, phenylazo or s substituted phenylazo.

4. The material of claim 3 wherein the phenylazo group of $R_3$ is substituted in the phenol ring by a methyl-benzoate group.

5. The material of claim 1 wherein the amino acid residue has from two to 12 carbon atoms.

6. The material of claim 1 wherein the amino acid residue is substituted in the amino group by phenyl.

7. The material of claim 1 wherein the amino acid residue is formed by an acid selected from the group consisting of glycine, α-alanine, β-alanine, phenyl-alanine, valine, leucine, serine, 4-amino-butyric acid and 6-amino-caproic acid.

8. The material of claim 1 wherein the amino acid residue is a peptide residue.

9. The material of claim 8 wherein the peptide is a dipeptide.

10. The material of claim 9 wherein the dipeptide is glycylglycine.

11. The material of claim 1, the compound having the formula

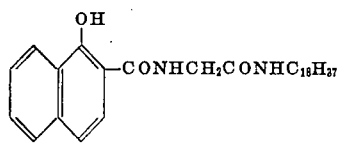

12. The material of claim 1, the compound having the formula

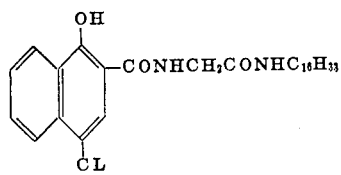

13. The material of claim 1, the compound having the formula

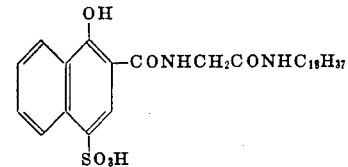

14. The material of claim 1, the compound having the formula

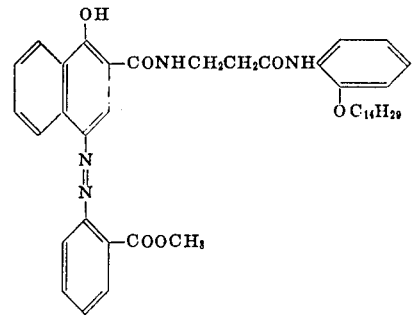

15. The material of claim 1, the compound having the formula

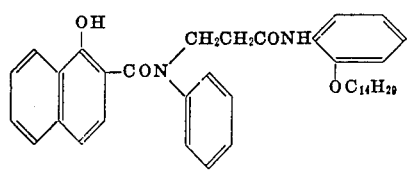

16. The color-photographic material of claim 1 wherein a plurality of silver halide emulsions is superposed on said support, one of the emulsions containing said coupler compound and at least one other emulsion containing the coupler compound for another primary color component.

* * * * *